United States Patent [19]

Hassler et al.

[11] Patent Number: 5,805,046

[45] Date of Patent: Sep. 8, 1998

[54] CURRENT RESPONSIVE LATCHING APPARATUS FOR DISCONNECTING AND ISOLATING AN ELECTRICAL DEVICE

[75] Inventors: Stephen Paul Hassler, Muskego, Wis.; Stephen Paul Johnson, Olean, N.Y.; John Lapp, Franklin, Wis.

[73] Assignee: Cooper Industries, Inc., Houston, Tex.

[21] Appl. No.: 418,955

[22] Filed: Apr. 7, 1995

Related U.S. Application Data

[60] Division of Ser. No. 174,946, Dec. 27, 1993, Pat. No. 5,440,287, which is a continuation-in-part of Ser. No. 946,961, Sep. 17, 1992, Pat. No. 5,274,349, and a continuation-in-part of Ser. No. 67,512, May 24, 1993, Pat. No. 5,559,488, and a continuation-in-part of Ser. No. 65,439, May 24, 1993, Pat. No. 5,355,111.

[51] Int. Cl.$^6$ ................................................ H01H 71/10
[52] U.S. Cl. ........................ 337/168; 337/169; 337/171; 337/174; 337/158
[58] Field of Search .................................... 337/168, 158, 337/169–181, 293, 273

[56] References Cited

U.S. PATENT DOCUMENTS

| | | | |
|---|---|---|---|
| 3,437,971 | 4/1969 | Mikulecky | 337/158 |
| 3,611,240 | 10/1971 | Mikulecky | 337/178 |
| 3,774,137 | 11/1973 | Carothers | 337/174 |
| 3,825,871 | 7/1974 | Blewitt | 337/171 |
| 3,827,010 | 7/1974 | Cameron et al. | 337/168 |
| 3,863,187 | 1/1975 | Mahieu et al. | 337/162 |
| 3,913,050 | 10/1975 | Mikulecky | 337/159 |
| 4,011,537 | 3/1977 | Jackson, Jr. et al. | 337/171 |
| 4,114,128 | 9/1978 | Cameron | 337/162 |
| 4,158,830 | 6/1979 | Biller et al. | 337/248 |
| 4,184,138 | 1/1980 | Beard et al. | 337/168 |
| 4,336,521 | 6/1982 | Kozacka et al. | 337/252 |
| 4,414,527 | 11/1983 | Biller | 337/180 |
| 4,481,495 | 11/1984 | Jarosz et al. | 337/159 |
| 4,506,249 | 3/1985 | Huber et al. | 337/232 |
| 4,540,968 | 9/1985 | Kato et al. | 337/31 |
| 4,542,363 | 9/1985 | Kato et al. | 337/31 |
| 4,570,146 | 2/1986 | Huber et al. | 337/158 |
| 4,625,196 | 11/1986 | Muench et al. | 337/212 |

Primary Examiner—Leo P. Picard
Assistant Examiner—Jayprakash N. Gandhi
Attorney, Agent, or Firm—Conley, Rose & Tayon, P.C.

[57] ABSTRACT

A current responsive latching apparatus may be employed in a dropout fuseholder or other electrical component for retaining the component in a current-carrying position and disconnecting and isolating the electrical component upon the occurrence of an overcurrent of a predetermined magnitude. The apparatus includes a current path through the component, including a current-carrying stud or conductor, a portion of which extends outside the component for releasably engaging a support member. A latching apparatus, which may include an actuating member of memory allow or a bimetallic material, engages the conductor to retain the support member in a supporting position beneath the electrical component. The apparatus may further include a heater element in the current path to ensure that the actuation member is heated to the temperature necessary to cause it to change shape and release the conductor upon the presence of an overcurrent.

21 Claims, 5 Drawing Sheets

CURRENT RESPONSIVE LATCHING APPARATUS FOR DISCONNECTING AND ISOLATING AN ELECTRICAL DEVICE

This is a divisional continuing application of U.S. patent application Ser. No. 08/174,946, filed on Dec. 27, 1991U.S. Pat. No. 5,440,287, which application is a continuation-in-part of the following U.S. patent application Ser. Nos. 07/946,961, filed Sep. 17, 1992, U.S. Pat. No. 5,274,349, U.S. Ser. No. 08/067,512, filed May 24, 1993, U.S. Pat. No. 5,559,488; and Ser. No. 08/065,439, filed May 24, 1993, U.S. Pat. No. 5,355,111.

FIELD OF THE INVENTION

The present invention relates generally to electrical power distribution equipment. More particularly, the invention relates to apparatus for automatically disconnecting electrical components from the energized network. Still more particularly, the invention relates to releasable latching apparatus which employs current responsive elements for disconnecting and isolating an electrical component from an energized conductor upon the occurrence of a fault.

BACKGROUND OF THE INVENTION

Electrical transmission and distribution networks consist of a staggering number of transformers, capacitor banks, reactors, motors, generators and other major pieces of electrical equipment. Such equipment is extremely expensive. Further, each such piece of equipment typically plays a vital role in the distribution of power to end users, such that an outage caused by the equipment being damaged or taken out of service for repairs, may have exceptionally costly consequences. As a result, such equipment is typically protected from potentially damaging overvoltages and overcurrents by protective components, such as fuses and surge arresters.

A fuse is a current interrupting device which includes a current-responsive element that will melt or fuse open when an overcurrent or short circuit of a predetermined magnitude and duration is conducted through the fuse. After the fuse has operated to interrupt the overcurrent, it must be replaced in order to restore service.

A particularly convenient and desirable fusing device is a dropout fuseholder. A dropout fuseholder includes a pair of terminals for connecting the fuseholder to the circuit that is to be protected, and an actuation means for causing the fuseholder to physically drop out of engagement with the energized circuit after the fuse has operated to clear a fault. The drop open feature provides a clear visual indication to utility personnel that the fuse has operated. Further, the drop open feature removes the fuseholder from the voltage stress otherwise associated with the energized circuit, eliminating the possibility of tracking and ultimate flashover around the fuse.

A typical prior art dropout fuseholder is disclosed in U.S. Pat. No. 3,611,240 (Mikulecky). Mikulecky discloses a current-limiting dropout fuseholder having a full range of fault clearing capability. As disclosed in that patent, upon actuation of the fuse, an explosive charge is ignited which actuates the dropout mechanism and frees the fuseholder to drop out of engagement with the cutout mounting in which it is installed. Similarly, U.S. Pat. No. 3,825,871 (Blewitt) also discloses a dropout fuseholder which employs an explosive charge to initiate dropout.

Although such explosive charges have generally been successfully employed in the industry, it is not uncommon for such a fuse to fail to drop open after clearing a fault due to a failure of the charge to detonate. Such failure is frequently due to the powder of the explosive charge absorbing too much moisture to ignite after a prolonged period of service. No matter the reason for such failures, the failure of a dropout fuse to drop open after operation is a source of great frustration and delay to utility personnel who are unable to identify the actuated fuses by visual observation, and must instead resort to more time consuming and less convenient means for detecting which fuses have operated. Further, a fuseholder that has failed to drop open remains subject to the voltage stress imposed by the energized network, making it susceptible to tracking and possible flashover.

Accordingly, despite advances made in fuse technology over the years, further improvements would be welcomed by the industry. Specifically, there is a need for a mechanically operable dropout mechanism that would retain the fuseholder in its current carrying position until actuation of the fusible element, and would reliably cause the fuse to drop open upon actuation of the fuse. The dropout mechanism should allow the fuse to completely clear the fault before dropout is initiated. Ideally, the device would be simple and inexpensive to manufacture, and would provide dependable operation without the need to rely upon an explosive charge.

SUMMARY OF THE INVENTION

The present invention provides a current-responsive, releasable latching apparatus useful for retaining an electrical component in electrical engagement with an energized network and for disconnecting the component from the network when certain predetermined conditions are present. The invention may, for example, be applied in a current-limiting dropout fuseholder so as to retain the fuseholder in its current=carrying position until actuation of a fusible element, at which time the invention disconnects the fuseholder from its current-carrying position and allows it to drop open so as to isolate the fuseholder from the energized network.

The invention includes an electrical component having a current path through the body of the component. The path includes a conducting pin partially extending outside the body of the electrical component. The conducting pin is disposed through an aperture in a supporting member adjacent to the component body, the supporting member being retained in position by an actuating member which engages the pin until such time as a predetermined current is conducted through the electrical component. Heat generated by the conduction of such predetermined current causes the actuating member to change shape and release the conducting pin, thereby freeing the supporting member which may then be biased away from the electrical component, allowing it to drop out of engagement with a line-potential terminal. The actuating member may comprise a metallic member made from memory alloy or from a bimetallic material, and includes latching tangs or clamping arms for engaging the conducting pin until the actuating member reaches a predetermined temperature.

To ensure that the actuating member reaches the predetermined temperature required for it to change shape and release the pin member, the invention may include a heater element in the current path. The heater element may comprise, for example, a silicon carbide ring or a member formed of other material having a high electrical resistance. The heater element is placed in physical contact with the actuating member such that when current is conducted through the current path, the heat generated by the heater element will be conducted to the actuating member.

In an alternative embodiment, rather than a conducting pin, the current path includes a trigger wire that is disposed through a central aperture in a conducting washer that is disposed within the lower conducting end cap of a fuseholder. The gap between the washer's aperture and the trigger wire forms a spark gap in the fuseholder. The trigger wire extends outside the lower end cap and is attached to a supporting member rotatable between a nonsupporting and supporting or latched position beneath the end cap. When fault current is conducted through this current path, an arc is developed between the trigger wire and the conducting washer. The heat of the arc severs the trigger wire thereby releasing the support member and allowing the fuseholder to drop out of engagement with the energized network.

To ensure that the trigger wire is severed in even the lowest current-rated fuseholders, the conducting washer, the trigger wire, or both, may be made of a material generating an exothermic reaction when exposed to the heat of the arc, such materials including magnesium, aluminum or thermite. Heat generated by the oxidation of these materials when exposed to the heat of the arc (and in some cases by the continuation of oxidation after the arc has been extinguished) will add to the heat produced by the arc to ensure that the trigger wire will be completely severed.

The invention may also include a frangible fastener disposed through a latch member of a hinge assembly that is used to support an electrical component. The latch member remains in the latched position until current is diverted through an ignition circuit of an explosive charge that is disposed in the frangible fastener. A means is provided for diverting current conducted through the component into the explosive charge. Ignition of the explosive charge causes the frangible fastener to disintegrate, releasing the latch and allowing the component, a fuseholder for example, to drop out of engagement with an energized electrical network.

Thus, the present invention comprises a combination of features and advantages which enable it to substantially advance fuse and other component technology by providing a current-responsive latching apparatus for disconnecting such devices and isolating them from an energized network. The invention provides a mechanical apparatus that will reliably retain the component in its normal current-carrying position but permit dropout upon the occurrence of an overcurrent of a predetermined magnitude. These and various other characteristics and advantages of the present invention will be readily apparent to those skilled in the art upon reading the following detailed description and referring to the accompanying drawings.

BRIEF DESCRIPTION OF THE DRAWINGS

For a detailed description of the preferred embodiments of the invention, reference will now be made to the accompanying drawings wherein.

DESCRIPTION OF THE PREFERRED EMBODIMENTS

A variety of types of costly electrical equipment must be protected from potentially damaging overcurrents and overvoltages. A common type of overcurrent protection is the dropout fuseholder which protects the downstream equipment from fault currents and which, after actuation, drops out of engagement from its cutout mounting to provide a visual indication that the fuse has operated. The present invention provides a latching apparatus to maintain the fuseholder in its current carrying position within the cutout mounting, but which releases the fuseholder and allows drop open movement to occur after the fuse has interrupted the flow of fault current; however, the invention is believed to have a much broader application beyond current limiting fuseholders. Accordingly, for purposes of example only, and not by way of limiting the present invention in any way, the invention will be described with reference to its use in a current limiting dropout fuseholder, it being understood that the invention may also be employed with any of a variety of other electrical components where a means for disconnecting and isolating the component from an energized conductor is desirable.

Figure 1:
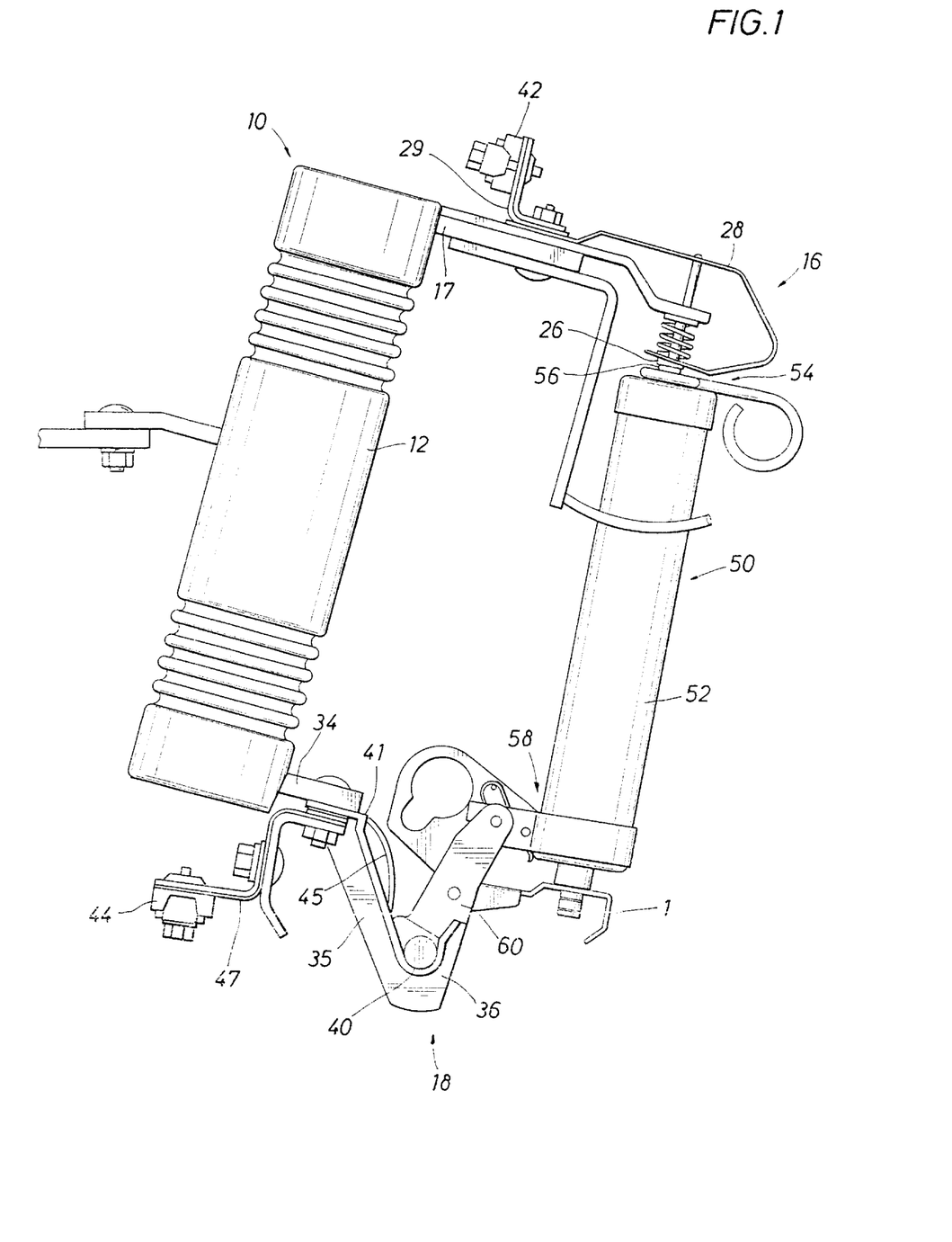
FIG. 1 is a side elevational view of a current limiting dropout fuseholder including the latching apparatus of the present invention, the fuseholder being shown mounted in a conventional interchangeable cutout mounting.

Referring initially to FIG. 1, the latching apparatus 1 of the present invention is shown employed in current limiting dropout fuseholder 50. Fuseholder 50 is shown installed in a conventionally known interchangeable cutout mounting 10.

Cutout mounting 10 generally comprises insulator 12 and upper and lower terminal assemblies 16 and 18, respectively, which are mounted on opposite ends of insulator 12 on upper and lower terminal support members 17 and 34. Upper terminal assembly 16 generally includes terminal pad 42, for receiving and clamping an electrical line conductor (not shown), conducting strap 28 and a cup contact 26 which is integrally formed in conducting strap 28. Conducting strap 28 electrically interconnects cup contact 26 and terminal pad 42 through terminal shunt 29. Lower terminal assembly 18 generally includes terminal pad 44, current shunt 47 and mounting hinge 35. Mounting hinge 35 includes a pair of hanger arms 36 and is formed of brass or another electrically conducting material. Formed within arms 36 are U-shaped elbows 40 for supporting fuseholder 50. Attached to upper surface 41 of mounting hinge 35 are conducting spring clips 45 biased against the hinge assembly of the fuseholder 50 to insure good electrical contact. Terminal pad 44 is provided for receiving and clamping an electrical line conductor (not shown). Lower current shunt 47 provides good electrical contact between mounting hinge 35 and lower terminal pad 44.

In the preferred embodiment, fuseholder 50 comprises a full range, current-limiting dropout fuseholder, similar to that described and claimed in copending U.S. patent application Ser. No. 07/946,961, filed Sep. 17, 1992, the entire disclosure of which is incorporated herein by reference.

Fuseholder 50 generally comprises fuse body 52 having upper cap assembly 54 and lower cap and hinge assembly 58. Upper cap assembly 54 includes a top contact 56. Lower cap and hinge assembly 58 includes latching apparatus 1 and a conducting hinge member 60 which, as described below, is electrically interconnected through fuse body 52 with top contact 56. Top contact 56 is disposed within the recess of cup contact 26, and hinge member 60 is engaged by hanger arms 36 of cutout mounting 10.

Figures 2, 4, 5:
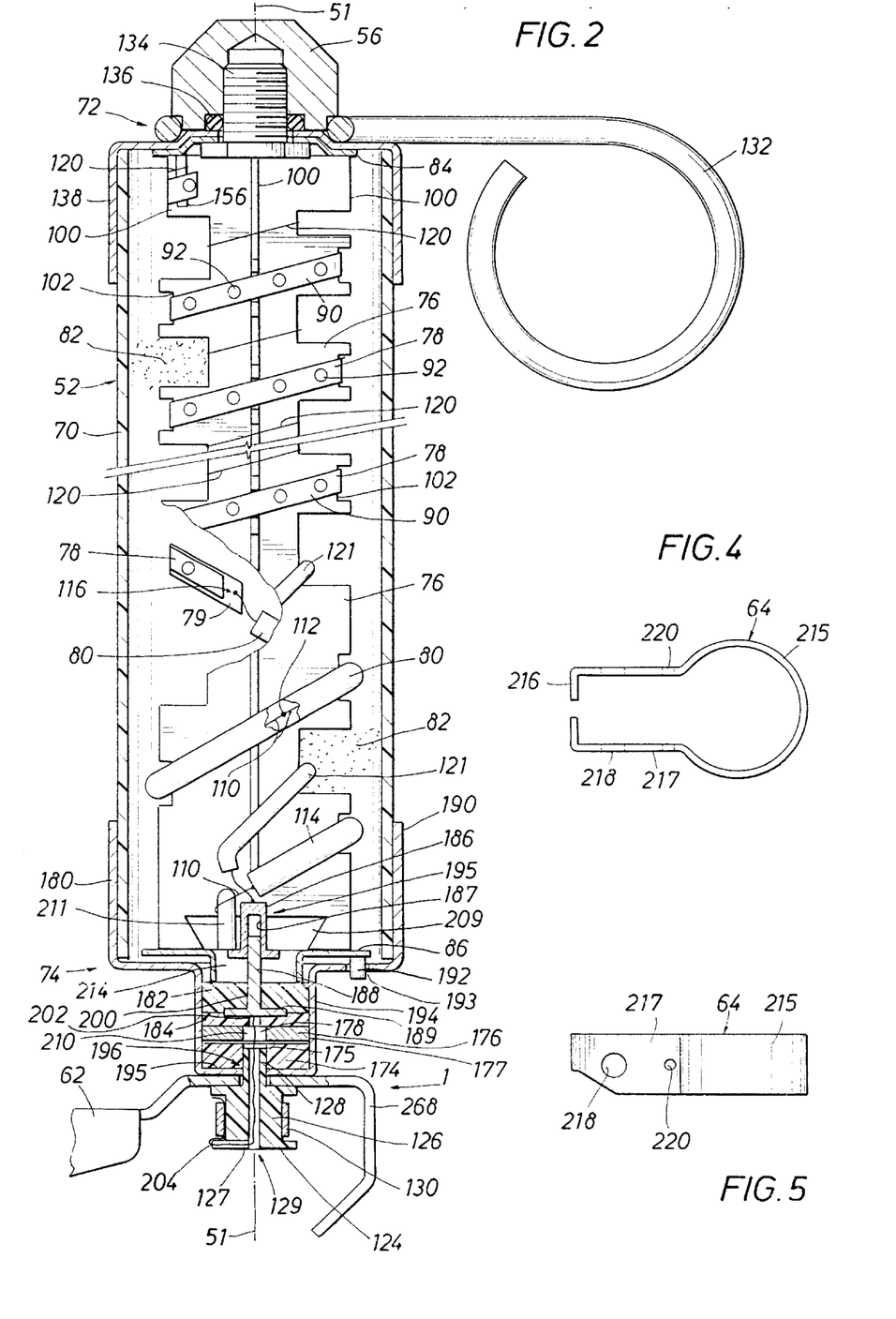
FIG. 2 is a cross-sectional view of the fuse body of the current limiting fuseholder shown in FIG. 1.
FIG. 4 is a top view of the connective member of the lower cap and hinge assembly shown in FIG. 3.
FIG. 5 is a side view of the connective member shown in FIG. 4.

Referring now to FIG. 2, fuse body 52 includes an insulative fuse tube 70 disposed about longitudinal fuse axis 51. A high current fusible element 78 and a low current fusible element 80 are housed in fuse tube 70 and are connected in series between upper and lower element terminations 84, 86 respectively. Fuse tube 70 is a generally tubular member which is closed at its ends by upper and lower closures 72, 74, respectively. Fuse body 52 houses an insulative supporting structure known as a spider 76 which supports fusible elements 78 and 80. High purity silica sand 82 or other materials having suitable interrupting and insulation characteristics surrounds spider 76 and fusible elements 78, 80 and fills the unused volume within fuse body 52. Spider 76 is made of an inorganic mica and it includes four arms 100 radiating from the longitudinal axis 51, three of arms 100 being visible in FIG. 2. Evenly spaced along the length of each arm 100 are element support surfaces 102.

Upper and lower element terminations 84, 86 respectively are formed of a conducting material, preferably copper, and serve as supports for arms 100 of spider 76 and as landings and termination points for fusible elements 78, 80 and for the upper end of auxiliary wire 120, as described below. Element terminations 84, 86 include angular tabs 209 for maintaining the separation between spider arms 100. The upper end of ribbon 90 is soldered to conducting tab 156 on upper element termination 84.

High current fusible element 78 comprises a ribbon element 90 made of silver or other electrically conducting material. Ribbon element 90 includes an array of reduced area portions 92 which comprise holes that are formed through the thickness of ribbon 90. As alternatives to holes, notches may be formed along the edges of ribbon 90, or combinations of holes and notches may be used to reduce the cross sectional area of ribbon 90. Ribbon 90, with its reduced area portions 92, is helically wound on the element support surfaces 102 of spider arms 100.

Referring still to FIG. 2, connected in series with high current fusible element 78 is low current fusible element 80. The series connector between fusible elements 78 and 80 is formed by copper conducting strap 79 which is supported on spider 76. Low current fusible element 80 is designed to operate at a predetermined current level below that level at which high current fusible element 78 is designed to operate. Depending on the current rating of the fuseholder 50, low current fusible element 80 is comprised of one or more parallel connected conducting wires 110 (one shown in FIG. 2), which are preferably formed of silver or other good electrically conductive material and insulated in silicone rubber coverings 114. The covered wire 110 is then helically wrapped about the lower section of spider 76. One end of wire 110 is attached to conducting strap 79 at termination point 116 by soldering. The other end of wire 110 is conductively attached to tab 211 of lower element termination 86 also by soldering.

Wire 110 of fusible element 80 is made from two approximately equal lengths of wire that are soldered together as at junction 112 with a solder having a substantially lower melting temperature than that of wire 110. The electrically conductive material used for wire 110 or the solder used at junction 112 has thermal characteristics causing it to melt at a temperature consistent with the time-current characteristic requirements of the fuse. Although junctions 112 are completely insulated by covering 114, for clarity, wire 110 is depicted in FIG. 2 with a portion of covering 114 cut away.

Also disposed within fuse body 52 is auxiliary wire 120. Preferably, auxiliary wire 120 is formed of silver for higher current rated fuses and a conductor of higher resistivity such as nichrome for lower current rated fuses. Auxiliary wire 120 is helically wound about spider 76 so as to be concentrically disposed within the helix formed by ribbon 90 and wire 110. In this fashion, auxiliary wire 120 does not contact ribbon 90 or wire 110 except, as described below, near its upper point of termination. The lower segment 121 of auxiliary wire 120 is insulated in a silicone rubber covering as it enters the space occupied by the helix formed by low current fusible element 80. The upper end of auxiliary wire 120 is soldered to tab 156 of upper element termination 84. The lower end of auxiliary wire 120 terminates on flanged receptacle 186 which is made of brass or other conducting material and retained in a central recess 185 formed along fuse axis 51 in the lower end of spider 76. A conducting insert 188, preferably made of brass, is inserted into bore 187 of receptacle 186 and is electrically connected to a trigger wire 204 which preferably is made of high strength and high electrical resistance nichrome. Trigger wire 204 forms a part of latching apparatus and extends outside of fuse body 52 through lower closure 74. Conducting receptacle 186, insert 188 and trigger wire 204 are all electrically insulated from lower closure 74.

Upper cap assembly 54 generally comprises top contact 56, pull ring 132, top end cap 138 and upper element termination 84, all of which are attached and their positions relative to one another maintained by the use of a single fastener, stud 134. An o-ring seal 136 is disposed about stud 134 between top contact 56 and end cap 138. Stud 134 includes a central longitudinal bore (not shown) to permit filling of fuse tube 70 with sand 82 upon assembly of fuseholder 50.

Lower closure 74 generally comprises bottom end cap 180, lower element termination 86, seal member 182, positioner 184, conductive washer 176 and insulative spacer 174. Bottom end cap 180 is formed of copper alloy or other conducting material and generally includes a cylindrical body portion 190 disposed about fuse tube 70 and a generally cylindrical reduced diameter extension 194 attached to and extending from the center of cylindrical body portion 190 thereby forming an interior recess within extension 194. Extension 194 and body 190 are generally coaxially aligned with fuse axis 51. An aperture 196 is formed substantially in the center of lower surface 195 of extension 194 at the intersection with axis 51.

Lower element termination 86 includes central aperture 214 which is substantially aligned with fuse axis 51, and further includes conducting tab 211 which serves as a landing and termination point for wire 110 of low current fusible element 80 as shown in FIG. 2. Lower element termination 86 is electrically connected to bottom end cap 180 by means of conducting tab 192. Tab 192 is formed on and extends from element termination 86 through hole 193 formed in bottom end cap 180. The portion of tab 192 extending through end cap 180 is bent over and soldered to cap 180.

Coaxially disposed within the central recess of end cap extension 194 are insulative spacer 174, conductive washer 176, wire positioner 184 and seal member 182. Seal member 182 comprises a rubber washer having central aperture 200. Wire positioner 184 comprises an insulative washer made of mica or nylon or other insulating material and includes central aperture 202. Washer 176 is made of an electrically conductive material and includes a central aperture 178 and an outer edge surface 177 which engages the walls of extension 194 so as to create a current path therethrough. Insulative spacer 174, which may be made of rubber or nylon, for example, includes a central aperture 175. Trigger wire 204 is brazed or soldered to conducting insert 188. Insert 188 includes flange 189 which is disposed between seal member 182 and positioner 184. Aperture 202 of wire positioner 184 has a diameter that is smaller than the diameter of aperture 178 of conducting washer 176 so as to centrally position trigger wire 204 in aperture 178.

Receptacle 186, adapted to receive and electrically engage insert 188, is disposed through central hole 214 in lower element termination 86 and is retained in central recess 185 in the lower end of spider 76. Receptacle 186 is attached to, and in conducting engagement with, auxiliary wire 120 as previously described, but does not contact element termination 86. Conducting insert 188 is inserted into bore 187 of conducting receptacle 186 through hole 214 of lower element termination 86 during assembly of fuse body 52 with trigger wire 204 extending out of fuse body 52 through aperture 196 in end cap 180, passing through apertures 175, 178, 202, 200 of spacer 174, conducting washer 176, positioner 184, and seal 182, respectively. The lower segment 121 of auxiliary wire 120, receptacle 186, insert 188 and trigger wire 204 are all electrically insulated from lower cap and hinge assembly 58. A spark gap 210, which preferably is approximately 0.040 inches for all voltage and current ratings for fuseholder 50, is thus formed between trigger wire 204 and washer 176 and itself forms part of latching apparatus 1.

Figure 3:
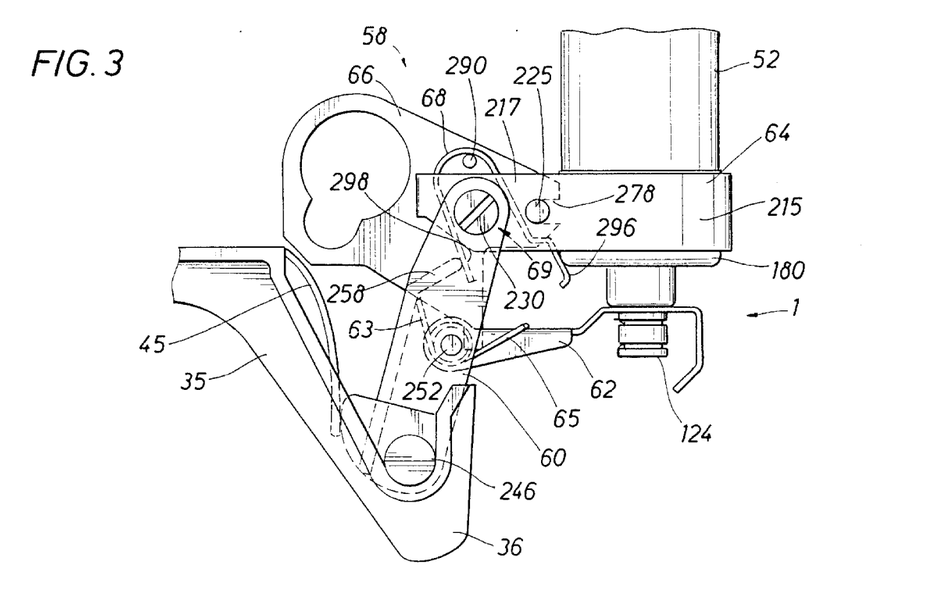
FIG. 3 is a side elevational view of the latching apparatus of the present invention and the lower cap and hinge assembly of the fuseholder shown in FIG. 1.

Referring now to FIGS. 3–5, lower cap and hinge assembly 58 of fuseholder 50 generally includes latching apparatus 1, hinge member 60, and connective member 64. Best shown in FIGS. 4 and 5, connective member 64 functions like a clamp and generally includes a strap portion 215 and a pair of hinge supporting members 217 attached thereto. The ends 216 of hinge supporting members 217 are bent toward one another and formed at substantially right angles to hinge supports 217. Two pairs of aligned holes 218, 220 are formed in hinge supporting members 217. As best shown in FIG. 3, fastener 225 is disposed through aligned holes 220 in order to draw together hinge supporting members 217 and to secure and clamp strap portion 215 of connective member 64 about bottom end cap 180.

Figure 6:
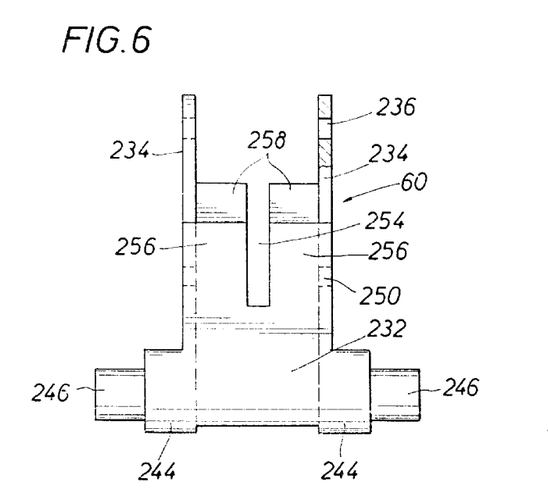
FIG. 6 is a top view of the hinge member of the lower cap and hinge assembly shown in FIG. 3.
Figure 7:
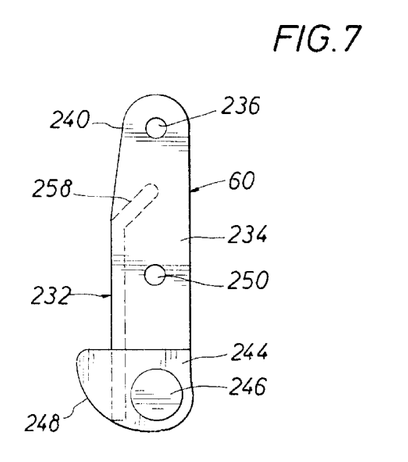
FIG. 7 is a side elevational view of the hinge member shown in FIG. 6.

Referring to FIGS. 3, 6 and 7, hinge member 60 generally comprises base portion 232 and a pair of outwardly extending side members 234. Side members 234 include tapered edge 240, shoulder 244 and two pairs of aligned holes 236, 250. Holes 236 are formed through side members 234 adjacent tapered edge 240. Shoulder portions 244 have trunions 246 extending outwardly therefrom and include cam-like electrical contact surfaces 248 adapted for electrical engagement with conducting spring clips 45 of mounting hinge 35 shown in FIG. 1. Holes 250 are formed in side members 234 between holes 236 and shoulders 244. Base 232 extends between side members 234 and includes slot 254. Slot 254 generally bisects base 232 forming a pair of leg portions 256. Legs 256 include ends 258 which extend outwardly from base 232 at an angle which is substantially equal to 45° and form a shoulder which engages and supports one end of the current interchange 68, best shown in FIG. 3.

Figure 8:
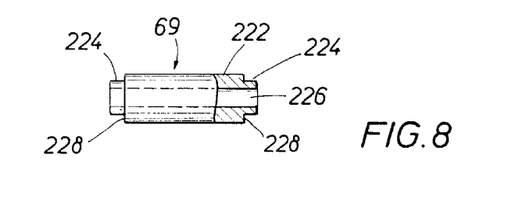
FIG. 8 is a side elevational view, partly in cross-section, of the sleeve for the lower cap and hinge assembly shown in FIG. 3.

Referring now to FIGS. 3 and 8, cap and hinge assembly 58 further includes sleeve 69. Sleeve 69 generally comprises a cylindrical body 222 having reduced diameter portions 224 at each end, forming shoulders 228. A central bore 226 is longitudinally formed through sleeve 69. Reduced diameter portions 224 are disposed in holes 218 of hinge supporting members 217 of connective member 64 (FIG. 4) such that members 217 abut shoulders 228. Sleeve 69 provides a spacing means to maintain the proper separation between hinge supporting members 217 and provides a bearing means for a pin 230, which is disposed through central bore 226 and which supports hinge member 60 (FIG. 3).

Figure 9:
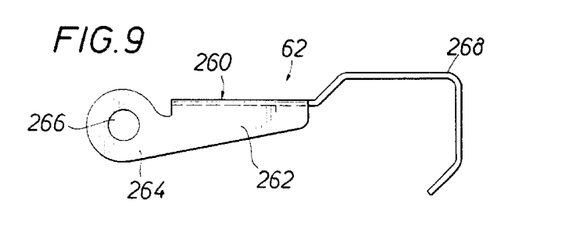
FIG. 9 is a side view of the latch member of the latching apparatus shown in FIG. 3.
Figure 10:
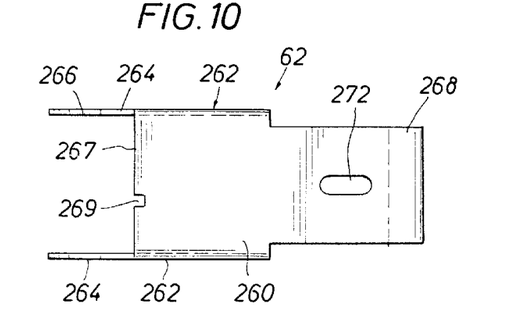
FIG. 10 is a top view of the latch member shown in FIG. 9.

Latching apparatus 1 includes, in addition to spark gap 210 and trigger wire 204, latch 62, spring 63 and latch plate 66. As best shown in FIGS. 3, 9 and 10, latch 62 generally comprises base 260, side members 262, and fuse restraining end 268. Side members 262 are attached to, and extend substantially perpendicularly from, base 260. Side members 262 include ears 264 having aligned holes 266 formed therein. Pin 252 (FIG. 3) is disposed through aligned holes 266 such that latch 62 is rotatably mounted about pin 252. Spring 63 is also mounted around pin 252 between side members 262 to bias latch 62 to rotate about pin 252 in a clockwise direction as viewed in FIG. 3. Base 260 of latch 62 includes latching surface 267 extending between sides 262 for engaging latch plate 66 as described in more detail below. A notch 269 is formed in latching surface 267 for receiving spring arm 65 of spring 63, best shown in FIG. 3. The free end of latch 62 comprises fuse retaining end 268 which includes an elongate aperture 272. Latch 62 is preferably made of stainless steel, although any conductive or insulative material having sufficient rigidity and strength may be employed.

Referring again to FIGS. 2 and 3, latching apparatus 1 further includes a bobbin 124. Bobbin 124 is made of nylon or other insulative material and generally comprises a spool-shaped body 126 and an annular extension 128 attached to body 126. A central aperture 129 is formed through body 126 and extension 128. Upon assembly of fuseholder 50, fuse retaining end 268 of latch 62 is rotated into a latched or supporting position against extension 194 of bottom end cap 180. Aperture 272 in retaining end 268 of latch 62 is preferably a slot to allow annular extension 128 of bobbin 124 to properly align with fuse axis 51. Annular extension 128 of bobbin 124 is disposed through aperture 272 in latch 62 and the end of trigger wire 204 extending from fuseholder 52 is disposed through central bore 129 of bobbin 124. Trigger wire 204 is then bent and pressed into a radially formed groove 127 in lower surface of spool body 126 and held in place against the sides of body 126 by clamping band 130. When so attached, latch surface 267 of latch 62 engages projecting latch surface 276 of latch plate 66 (described below) to retain hinge member 60 and connective member 64 in fixed angular relationship to one another in a "contracted" and "charged" position, and prevent rotation about the joint means, i.e. pin 230 and sleeve 69.

Figure 11:
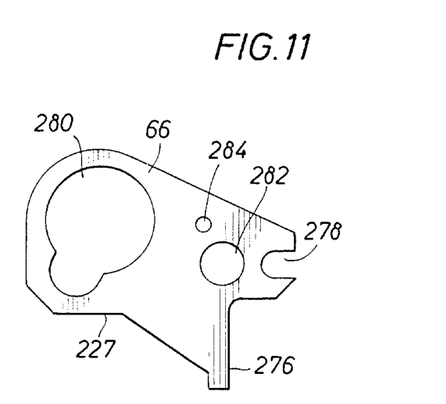
FIG. 11 is a side elevational view of the latch plate member of the lower cap and hinge assembly shown in FIG. 3.

Now with reference to FIGS. 3 and 11, latch plate 66 is a generally flat metal plate having a projecting latch surface 276 for engaging latching surface 267 of latch 62 (FIG. 10). Latch plate 66 further includes a notch 278 for receiving fastener 225 of connective member 64, a key way 280 for use in installing and removing fuseholder 50 by "hot stick," and an aperture 284 for receiving pin 290 shown in FIG. 3. Latch plate 66 further includes aperture 282 for receiving body 222 of sleeve 69 which, as previously described, is disposed between hinge supporting members 217 of connective member 64. Pin 230 is disposed through central bore 226 of sleeve 69 and through holes 236 of hinge member 60. Latch plate 66 is received in slot 254 of hinge member 60 (FIG. 6) and includes a stop shoulder 227 for limiting its rotation on pin 230 through engagement with pin 252. The rotatable mounting of connective member 64 and latch plate 66 about sleeve 69, together with the inter-engagement of the fastener 225 within the notch 278 cause latch plate 66 to be non-rotatably anchored to connective member 64. This connection means causes latch plate 66 and connective member 64 to always rotate as a single unit along with fuse body 52 about the joint means, i.e. pin 230 and sleeve 69.

Figure 12:
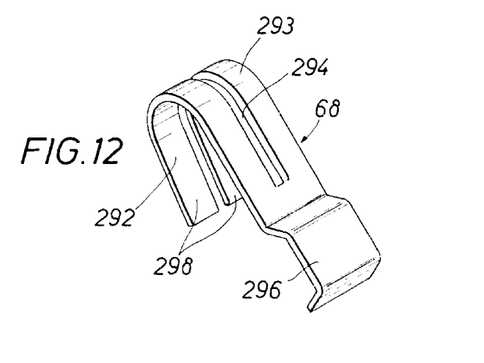
FIG. 12 is a perspective view of the current interchange of the lower cap and hinge assembly shown in FIG. 3.

Current interchange 68 is best shown in FIGS. 3 and 12. As shown, pin 290 is disposed through aperture 284 of latch plate 66 and provides support for current interchange 68. Current interchange 68 is preferably formed of phosphor bronze, a good electrical conducting material that is also suitable for use as a spring. Current interchange 68 includes a pair of U-shaped legs 292, 293 separated by slot 294 and connected by segment 296. Current interchange 68 comprises a means for conducting current between bottom end cap 180 of fuse body 52 and hinge member 60. Legs 292, 293 straddle latch plate 66, and are supported on pin 290 which projects from latch plate 66. Connecting segment 296 electrically engages bottom end cap 180 while ends 298 of legs 292, 293 electrically engage the ends 258 of legs 256 of hinge member 60. When engaged between fuse body 52 and hinge 60, current interchange 68 acts as a spring and imparts approximately 12 inch-pounds of torque between hinge 60 and fuse body 52 which assists hinge member 60 to rotate to its extended position to allow fuseholder 50 to drop out of engagement with cutout mounting 10.

Fuseholder 50 is shown in FIGS. 1 and 3 with hinge member 60 and connective member 64 in their contracted and charged position, and with latch 62 and latch plate 66 latched. So latched, fuseholder 50 is in its extended position and current is conducted from upper terminal 16 of cutout mounting 10 through fuseholder 50 to lower terminal assembly 18 by means of bottom end cap 180, current interchange 68, hinge member 60 and conducting spring clips 45 to mounting hinge 35 of lower terminal assembly 18.

Referring to FIGS. 1–3, when current limiting fuseholder 50 experiences an overcurrent of a predetermined magnitude and duration, fusible element 78 or 80 will fuse open. For an instant after this occurs, the overcurrent is conducted through fuseholder 50 to bottom end cap 180 via auxiliary wire 120, trigger wire 204, spark gap 210 and conducting washer 176. Trigger wire 204 has a high resistance, and the high $I^2R$ heating, coupled with the heat generated by the arc across gap 210 will sever trigger wire 204, thereby acting as a release means for releasing and freeing latch 62 from retainment by trigger wire 204 and bobbin 124. When this occurs, fuse restraining end 268 of latch 62, no longer held in contact with bottom end cap 180, is biased away from end cap 180 by spring 63. The weight of fuseholder 50 and the forces imparted thereon by top terminal assembly 16 and conducting spring clips 45 of interchangeable cutout mounting 10 and the spring force from current interchange 68 will cause the lower cap and hinge assembly 58 to begin to collapse about pin 230 to an extended position and cause the upper cap assembly 54 of fuse body 52 to drop out of engagement with top terminal assembly 16. When this occurs, fuse body 52 and lower cap and hinge assembly 58 will begin to rotate about trunion 246 in a clockwise direction as viewed in FIG. 3 until the fuseholder 50 reaches the dropout position and comes to rest supported by hanger arms 36 of interchangeable cutout 10.

The dropout position that results provides a clear and highly visible indication to linemen that the fuse has operated. Additionally, by causing the fuseholder 50 to drop out of engagement with interchangeable cutout mounting 10 upon the occurrence of an overcurrent, voltage stress is thus removed from the actuated fuse. This voltage stress could otherwise eventually lead to tracking along the outer surface of the fuseholder 50, and possible ultimate flashover between the upper and lower terminal assemblies 16 and 18 of interchangeable cutout mounting 10. Thus, the latching apparatus 1 offers a mechanically operable dropout mechanism that provides for dependable operation upon actuation of the fuse. The latching apparatus 1 is relatively inexpensive to produce and provides increased reliability over prior fuseholders which relied upon explosive charges to initiate drop open movement.

As apparent from the description above, dropout of fuseholder 50 is dependent upon the shifting of the fault current from a first current path including fusible elements 78, 80 into a second current path including auxiliary wire 120 and trigger wire 204, such that trigger wire 204 is severed by the heat generated from the arc that is formed across spark gap 210. Thus it is important from the standpoint of causing fuseholder 50 to drop open, that auxiliary wire 120 not melt and force the current to transfer back to the first current path of fusible elements 78, 80 too quickly, but instead remain conducting long enough for the arcing across gap 210 to sever trigger wire 204. On the other hand, the dropout function is of secondary importance to the ability of fuseholder 50 to interrupt the flow of fault current and to do so before the dropout action of fuseholder 50 causes any significant separation between the upper contact assembly 54 of fuseholder 50 and the cup contact 26 of cutout mounting 10. As the current ratings of fuseholder 50 decrease, the level of current that the fuse must be capable of interrupting and the allowable let through current (let thorough $I^2T$) during interruptions at all fault current levels decrease accordingly. The size of auxiliary wires 120 used in higher current rated fuses can be relatively large without having any adverse affect on such fuses' interrupting performance. On the other than, the size of the auxiliary wires 120 normally used in high current rated fuses can approach the size of the high current fusible element 78 used in lower current rated fuses and, if used in such lower current rated fuses, can adversely affect the interrupting performance by causing excessive let through PI for these lower current rated fuseholders 50. Also, even at the lowest level of current that these lower current rated fuseholders 50 must interrupt, the trigger wire 204 will be severed within several 60 Hz cycles after the current is shifted to the second current path which includes auxiliary wire 120. In these cases, the auxiliary wire 120 must be small enough that it can melt and interrupt these low level currents within the next several cycles of 60 Hz current flow. If the interruption is not accomplished within this time frame, an arc will develop between the separating upper contact assembly 54 of fuseholder 50 and the cup contact 26 of cutout mounting 10. This arc can cause the cutout mounting to flashover.

The requirements that dictate the size of the auxiliary wire 120 can be conflicting. On one hand, the wire must be large enough to allow completion of the severing of the trigger wire 204, while on the other hand the wire 120 must be small enough that it does not impede successful fault current interruption by the fuse. Difficulties in satisfying both requirements increase with lower current rated fuses since mechanical requirements for the trigger wire 204 do not allow the size of trigger wire 204 to be reduced accordingly. In higher current-rated fuseholders, such as those rated 18 amps and above, no tension exists between the requirement that auxiliary wire 120 melt soon enough to interrupt the fault current and the desire to have spark gap 210 conduct long enough to sever trigger wire 204. On lower current-rated fuses, however, such as those rated less than 18 amps, the auxiliary wire 120 selected to properly interrupt all the various magnitudes of fault currents that may be experienced by fuseholder 50 must be relatively small. So constrained, wire 120 may melt too quickly, causing conduction across gap 210 to cease before trigger wire 204 is severed. In this instance, although the fuse would perform its primary function of clearing the fault, the fuseholder would not drop open and provide the convenient indication means so valuable to utility personnel. This may cause considerable delays while utility personnel search to find the fuses which have operated to open a circuit.

To provide additional heating to insure that the trigger wire 204 is severed in lower current-rated fuses, conducting washer 176 may alternatively be made of a metal which undergoes an exothermic reaction under the heat of an arc. For example, conducting washer 176 may be made of or coated with magnesium, aluminum or thermite. Once an arc is formed between the trigger wire 204 and such a conducting washer 176, the heat generated by the oxidation of the aluminum, magnesium or thermite structure when exposed to the heat of the arc (and in some cases the continuation of the oxidation of the process after the arc has subsided) will add to the heat generated by the arc. Thus, a current flowing across the gap 210 of even a short duration, in conjunction with the heat provided by the burning metal, will cause the trigger wire 204 to be severed and release the latch 62, allowing dropout to occur. Alternatively, the trigger wire 204 itself may be manufactured of aluminum, magnesium or thermite instead of, or in addition to, using such material for the conducting washer 176.

In FIGS. 13–20, a number of other alternative embodiments of the present invention are shown which include alternative means for retaining latch 62 in the supporting position beneath fuseholder 50 prior to actuation of fusible elements 78 or 80, and for releasing the latch 62 upon actuation of either of the fusible elements. These alternative embodiments employ many elements that are identical to those previously shown and described. Accordingly, where like elements are shown and described, the identical reference number may be used.

Figure 13:
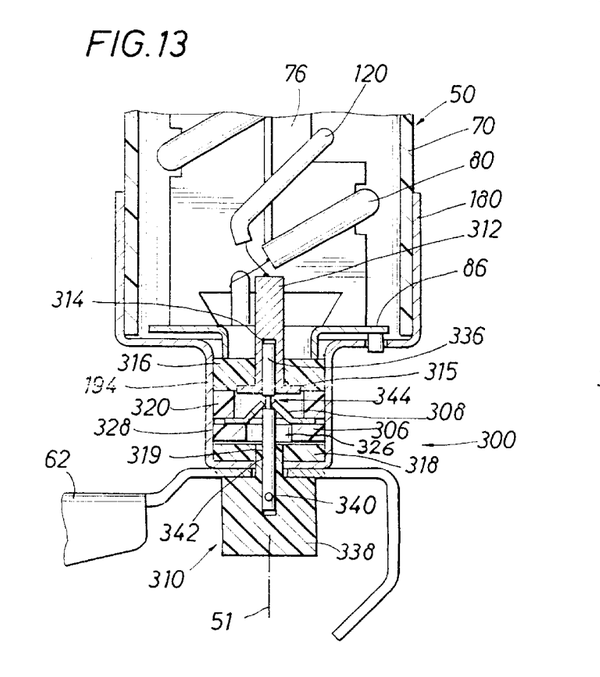
FIG. 13 is a partial cross-sectional view of an alternative embodiment of the latching apparatus of the present invention as applied to a current limiting dropout fuseholder.

Referring now to FIG. 13, there is shown a releasable latching apparatus 300 as applied to current-limiting fuseholder 50. Fuseholder 50 includes high current and low current fusible elements 78, 80, fuse tube 70, spider 76, upper and lower element terminations 84, 86, lower end cap 180, latch 62 and auxiliary wire 120, all as previously described with reference to FIGS. 1–12. Latching apparatus 300 generally comprises conducting receptacle 312, pin member 310, actuating member 308 and heat transfer ring 306. Conducting receptacle 312, preferably made of brass, is retained in spider 76 and includes a flange 315 and a central bore 314 generally aligned coaxially with the fuse axis 51. The receptacle 312 extends beyond the lower most edge of the lower termination member 86 and is centered within extension end cap 194 by annular spacer member 316 which preferably is made of nylon or rubber or another insulative material. Receptacle 312 is disposed through a central aperture formed in spacer member 316. Flange 315 on receptacle 312 retains spacer 316 in position between lower element termination 86 and receptacle 312.

Stacked in columnar fashion with annular spacer 316 within end cap extension 194 are lower annular seal 318, heat transfer ring 306, actuating member 308 and spacer 320. In the preferred embodiment, heat transfer ring 306 is comprised of silicon carbide, conductive rubber, or another material having a high electrical resistance. Heat transfer ring 306 includes a central aperture 326 generally aligned with the fuse axis 51 and includes an outer edge surface 328 which engages the inner surface of end cap extension 194 so as to create a current path therethrough. Disposed between heat transfer ring 306 and the bottom of end cap extension 194 is seal member 318. Seal 318 is preferably made of rubber and also includes a central aperture 319 generally aligned with the fuse axis 51.

Figure 14:
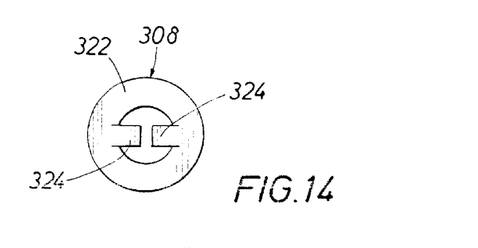
FIG. 14 is a top view of the actuating member of the latching apparatus shown in FIG. 13.

Referring to FIGS. 13 and 14, actuating member 308 is a washer-like member having a circular base portion 322 and a pair of latching tangs 324 integrally formed on base portion 322 and extending upwardly from the base and toward the fuse axis 51. Base 322 has an outer diameter less than the inside diameter of end cap extension 194 to ensure that base 322 does not engage end cap 180 when positioned in end cap extension 194. The base 322 of actuating member 308 is disposed against and physically and electrically engages heat transfer ring 306. Actuating member 308 is preferably made of a memory alloy such as the nickel-titanium shape-memory alloy known as Nitinol. Nitinol, its properties and physical characteristics are discussed in the article entitled "Shape-Memory Wires," authored by S. M. Tuominen and R. J. Biermann which was published in the February 1988 edition of *Journal of Metals,* incorporated herein by this reference. Alternatively, actuating member 308 may be made from a bimetallic material, such as thin layers of NiFe and NiCrFe bonded together. As known to those skilled in the art, memory alloy will rapidly deform or change shape when a particular threshold temperature is reached. Bimetallic materials can also be made to undergo a rapid change in shape when a threshold temperature is reached if the material is loaded while in an over center position. Heating will bias the material toward the position opposite its initial over center position until a threshold temperature is reached, at which time the material will snap to the opposite position. Actuating member 308 of the present invention is configured as shown in FIGS. 13 and 14 under normal operating conditions where the normal system current is flowing through fuseholder 50. These temperatures, under normal conditions, will not exceed 100° C.

Disposed between actuating member 308 and annular spacer 316 is another annular spacer 320. Upon assembly of fuseholder 50, base 322 of actuating member 308 is disposed between annular spacer 320 and heat transfer ring 306.

Retaining pin 310 of latching apparatus 300 includes a conducting insert or stud 336 and an insulative retainer 338 fastened to the lower end of stud 336. The retainer 338 may be fastened by adhesive or, as shown in FIG. 13, by a pin 340. Retainer 338 includes an annular extension or collar 342 disposed about a portion of stud 336 to insulate the stud 336 from end cap 194 after assembly. The stud 336 includes recesses which, in the preferred embodiment, comprise an annular groove 344 formed about the circumference of stud 336.

Upon assembly of fuseholder 50, latch 62 is rotated into the latched or supporting position beneath lower end cap 180 such that latch surface 267 of latch 62 engages projecting latch surface 276 of latch plate 66 to maintain hinge assembly 58 in its contracted position. Stud 336 of pin 310 is disposed through aperture 272 of latch 62 and through aperture 196 in extension 194 and is received in and engages bore 314 of receptacle 312. During insertion of stud 336 into end cap 180, tangs 324 of actuating member 308 are biased radially outwardly by conducting stud 336. As the stud 336 is further inserted, the tangs 324 snap radially inwardly into groove 344. This effectively locks the retaining pin 310 and prevents it from being withdrawn from fuseholder 50 until tangs 324 release stud 336.

As is apparent, a first current path exists in fuseholder 50 and includes the series combination of high and low current fusible elements 78, 80, lower termination 86, and lower end cap 180. A second current path, in parallel with the first, comprises the path formed by auxiliary wire 120, receptacle 312, stud 336, actuating member 308, heat transfer ring 306 and lower end cap 180. The separation of base 322 of actuating member 308 from end cap 180 prevents current flowing in the second path from bypassing heat transfer ring 306. Similarly, the insulative collar 342 on retainer 338 insulates stud 336 from latch 62, again ensuring current flow through heat transfer ring 306.

Figure 15:
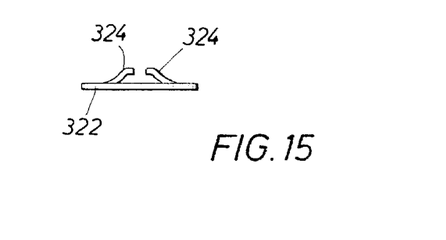
FIG. 15 is a side view of the actuating member of the latching apparatus shown in FIG. 13 showing the tangs of the actuation member in their retracted position.

In operation, the normal system current is conducted through the first current path which includes fusible elements 78, 80 due to the relatively high resistance of heat transfer ring 306. When fuseholder 50 experiences an overcurrent of a predetermined magnitude and duration, the high or low current fusible elements 78, 80 will fuse open. During this process, the overcurrent will then shift and be conducted through the fuseholder 50 to lower end cap 180 via the auxiliary wire 120, receptacle 312, stud 336, actuating member 308 and heat transfer ring 306 of the second current path. As the overcurrent continues to flow through heat transfer ring 306, the temperature of the silicon carbide ring will increase. With actuating member 308 physically engaging heat transfer ring 306, the heat generated by ring 306 will be conducted to actuating member 308. When the temperature of actuating member 308 reaches a predetermined magnitude, such as approximately 150° C., the tangs 324 of actuating member 308 will snap radially outwardly out of engagement with the stud 336 of retaining pin 310. Upon actuation, the tangs 324 will take the shape as shown in FIG. 15.

With the release of retaining pin 310 by actuating member 308, gravity, as well as the spring and other forces imposed on latch 62, will cause latch 62 to rotate out of the latched or supporting position beneath fuseholder 50, in a clockwise direction as viewed in FIG. 13. Such rotation releases projecting latch surface 276 of latch plate 66 and allows hinge assembly 58 to collapse to an extended position and, in turn, allows fuseholder 50 to drop out of engagement with cup contact 26 of cutout mounting 10.

Figure 16:
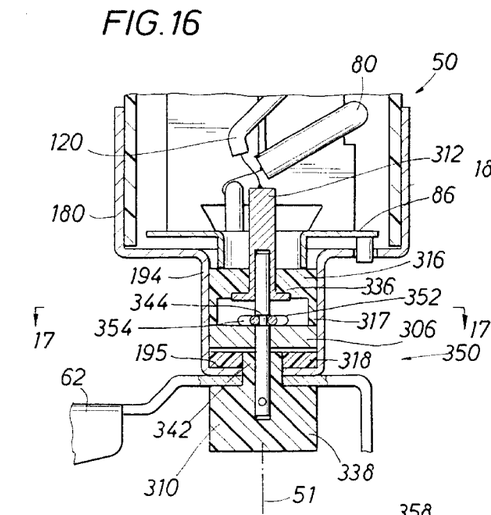
FIG. 16 is a partial cross-sectional view of another alternative embodiment of the latching apparatus of the present invention employed in a current-limiting dropout fuseholder.
Figures 17, 19, 20:
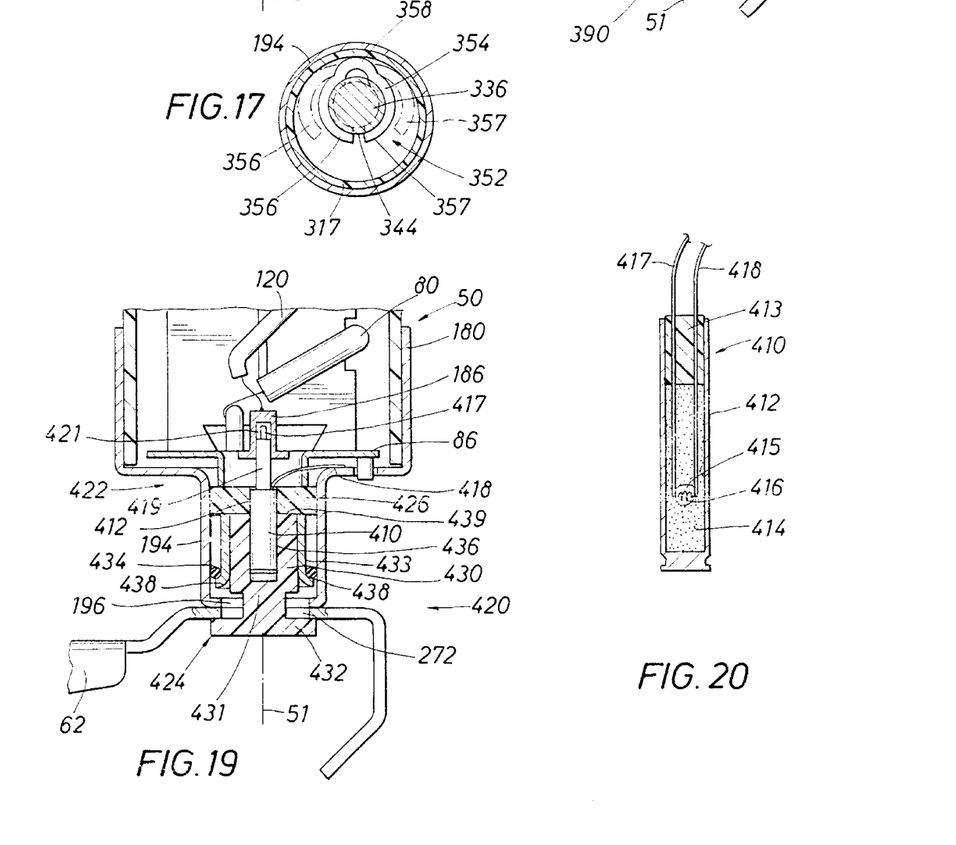
FIG. 17 is a cross-sectional view of the latching apparatus taken along line 17—17 in FIG. 16.
FIG. 19 is a partial cross-sectional view of another alternative embodiment of the latching apparatus of the present invention applied to a current limiting dropout fuseholder.
FIG. 20 is a partial cross-sectional view of the explosive squib of the latching apparatus shown in FIG. 19.

Referring now to FIGS. 16 and 17, there is shown another alternative embodiment of the present invention including releasable latching apparatus 350 suitable for use with current-limiting dropout fuseholder 50. Latching apparatus 350 generally includes conducting receptacle 312, heat transfer ring 306, lower annular seal 318 and retaining pin 310, all as previously described with reference to FIG. 13. Latching apparatus 350 further includes spacer 316 with annular insulating extension 317 and an actuating member 352, which comprises locking ring 354 preferably formed of a memory alloy such as Nitinol. As best shown in FIG. 17, the locking ring 354 generally comprises a pair of arms 356 and 357 that are connected to a central lobe 358. Locking ring 354 is disposed in extension 194 of end cap 180 where it is placed in contact with heat transfer ring 306 of silicon carbide or other similar material having a high electrical resistance. Insulating extension 317 of spacer 316 is disposed between the wall of end cap extension 194 and locking ring 354. Arms 356, 357 of locking ring 354 are disposed about stud 336 and engage groove 344 when the stud 336 is inserted through the latch 62 and into lower end cap 180. Seal 318 is disposed between heat transfer ring 306 and bottom 195 of end cap extension 194 and seals between end cap 180 and extension or collar 342 of retainer 338.

When an overcurrent of sufficient magnitude to melt fusible element 78 or 80 is conducted through fuseholder 50, the current will be diverted to the secondary current path formed by auxiliary wire 120, receptacle 312, stud 336, locking ring 354 and heat transfer ring 306 to bottom end cap 180. During such a fault condition, the current conducted through the high electrical resistance of heat transfer ring 306 will cause the ring to heat to an elevated temperature. In turn, the heat will be transferred to locking ring 354. When locking ring 354 reaches a temperature of approximately 150° C., ring 354 will change shape almost instantaneously and assume the configuration represented by the dashed lines shown in FIG. 17. This thermally induced change in shape causes arms 356, 357 to release retaining pin 310, thereby again permitting the latch 62 to rotate out of engagement with projecting latch surface 276 of latch plate 66, and permitting the fuseholder 50 to drop out of engagement with the cutout mounting 10.

Referring again to FIG. 16, it is evident that if only one of the arms 356, 357 moved out of engagement with groove 344 of stud 336, retaining pin 310 would still be retained by the remaining arm of locking ring 354. Accordingly, latching apparatus 350 would continue to maintain latch 62 in a supporting position beneath fuseholder 50. Accordingly, it is important to the operation of latching apparatus 350 that both arms 356, 357 move radially outwardly to the actuated position shown by the dashed lines in FIG. 17. To ensure that both arms of locking ring 354 clear groove 344 upon actuation of the fusible elements in fuseholder 50, locking ring 354 is dimensioned such that upon actuation, locking ring 354 takes a generally semi-circular shape having an outside diameter substantially equal to the inside diameter of annular extension 317 of spacer 316.

Figure 18:
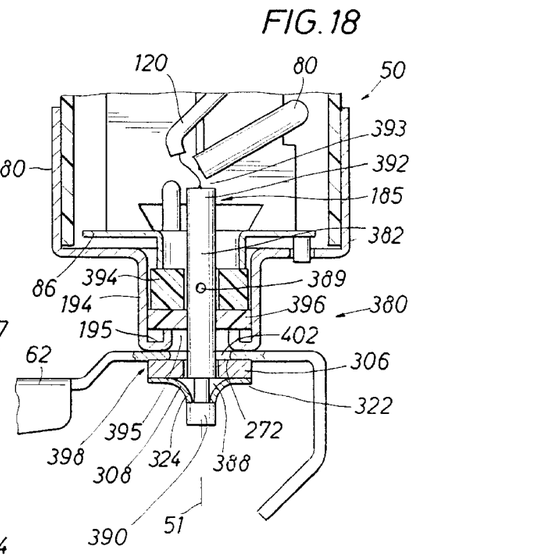
FIG. 18 is a partial cross-sectional view of still another alternative embodiment of the latching apparatus of the present invention applied to a current limiting dropout fuseholder.

Still another alternative embodiment of the present invention is shown in FIG. 18. As shown, releasable latching apparatus 380 retains latch 62 in the latched and supporting position beneath fuseholder 50 until an overcurrent of a predetermined magnitude and duration causes latching apparatus 380 to release. Latching apparatus 380 generally comprises heat transfer ring 306 and actuating member 308, both as previously described with reference to FIGS. 13–15. Alternatively, actuating member 308 may comprise a locking ring made of memory metal or a bimetallic material such as, for example, ring 354 which was described above with reference to FIGS. 16 and 17. Latching apparatus 380 further comprises pin member 382. Pin member 382 comprises a conducting stud having an annular groove 388 formed adjacent to lower end 390.

Upon assembly of fuseholder 50, upper end 392 of pin member 382 is seated within recess 185 formed along fuse axis 51 in spider 76. End 392 of pin member 382 is soldered or otherwise electrically connected to auxiliary wire 120 shown at 393. An insulative nylon washer 394 and annular rubber seal 396 are disposed between bottom 195 of end cap extension 194 and lower element termination 86. Pin member 382 is disposed through the central apertures of washer 394 and seal 396. Lower end 390 of pin 382 extends outside end cap extension 194 through aperture 196. In this embodiment, aperture 196 is made large enough to ensure that the air gap 395 between extension 194 and pin 382 is too large to permit conduction across the gap. Pin member 382 is fixed in this position by any suitable manner, such as by pin 389 which is disposed through pin 382 and into insulating washer 394 such that the ends of pin 389 remain electrically insulated from the walls of lower end cap extension 194.

Referring still to FIG. 18, latching apparatus 380 further comprises a shallow annular recess 398 formed in the lower surface of latch 62. To complete the assembly of fuseholder 50, latch 62 is rotated into its latched or supporting position beneath lower end cap 180 with latching surface 267 engaging projecting latching surface 276 of latch plate 66. Lower end 390 of pin member 382 is disposed through aperture 272 centrally formed through annular recess 398 of latch 62. Heat transfer ring 306 is placed about end 390 and seated within annular recess 398. Actuating member 308 is next disposed about end 390 of pin member 382 such that base 322 engages heat transfer ring 306, while tangs 324 engage pin member 382 in groove 388 so as to secure retaning end 268 of latch 62 between end cap extension 194 and heat transfer ring 306. Because in this embodiment heat transfer ring 306 does not physically contact end cap extension 194, latch 62 is made of stainless steel or another conducting material so as to complete the second current path through fuseholder 50.

Upon the occurrence of a fault of sufficient magnitude and duration, fusible elements 78, 80 will melt and the current will be transferred from that current path into the second path within fuseholder 50, the second current path including auxiliary wire 120 and pin member 382. The second current path to hinge 60 is completed by means of actuating member 308, heat transfer ring 306 and latch 62. As shown in FIG. 18, pin member 382 is insulated from bottom end cap 180 by seal 396, washer 394 and an air gap 395. Similarly, pin 382 is insulated from conducting latch 62 by air gap 402 formed between pin 382 and the edges of aperture 276.

When a fault current of predetermined magnitude is thus conducted through pin 382, actuating member 308 and heat transfer ring 306, the heat generated by the high electrical resistance ring 306 will cause actuating member 308 to heat to a predetermined temperature that will cause tangs 324 to snap apart and release pin 382. Thereafter, the spring force applied to latch 62 by spring 63 (FIG. 3) will cause latch 62 to rotate in a clockwise direction as viewed in FIG. 18, and actuating member 308 and heat transfer ring 306 will slide off end 390 of pin 382, allowing latch 62 to rotate free from engagement with fuseholder 50. As previously described, when this occurs, fuseholder 50 will then be permitted to drop out of engagement with cutout mounting 10.

In higher current-rated fuses, such as those rated 18 amps and above, conduction of fault current through the actuating member may itself be sufficient to heat the actuating member to the temperature necessary to cause it to release the pin member. Accordingly, as an alternative embodiment to those described with reference to FIGS. 13-18, for the higher current-rated fuseholders, the latching apparatus may not require a heat transfer element. Thus, in the embodiments of FIGS. 13, 16 and 18, the heat transfer ring 306 may be replaced with a simple washer of a conducting material, such as brass.

Another alternative embodiment of the releasable latching apparatus of the present invention is shown in FIGS. 19–20. The embodiment of FIGS. 19–20 employs an explosive charge, commonly known as a squib. Upon actuation of the fusible elements 78, 80 and the subsequent initiation of current flow through the auxiliary wire 120 and series-connected heater wire 416, the squib will explode to cause release of latch 62 as described more thoroughly below. Although the latching apparatus described with reference to FIGS. 1–18 may be more desirable from a cost, reliability and safety standpoint, the embodiment of FIGS. 19–20 employing the explosive charge may be convenient to manufacture given that squibs are presently widely used and readily available.

Referring momentarily to FIG. 20, a squib 410 generally comprises an outer casing 412, typically of brass, a powder charge 414 and a heater element 416 in contact with primer 415 which is embedded in powder charge 414 and surrounds heater element 416. A pair of lead wires 417, 418 are connected to the heater element 416 and are disposed through a rubber plug 413 which retains the powder inside casing 412. Lead wires 417, 418 are relatively stiff, bare wires, preferably 16 gauge or larger. As shown in FIG. 19, the segment of lead 417 adjacent to the upper end of casing 412 is covered with insulating sleeve 419. Insulating sleeve 419 extends into bore 187 of receptacle 186 positioning the bare segment of lead 417 from the wall of receptacle 186, thereby forming an arc gap 421 therebetween. Alternatively, the arc gap may be formed at the upper end of fuseholder 50 between conducting tab 156 of element termination 84 and the upper end of auxiliary wire 120. In such an alternative embodiment, sleeve 419 may be omitted and lead 417 may contact conducting receptacle 186; however, in any design, an arc gap is required at some location along the current path which includes auxiliary wire 120 to prevent ignition of the squib 410 by the milliamps of current which may be conducted through auxiliary wire 120 during nonfault conditions.

Referring still to FIG. 19, the latching apparatus 420 generally comprises two subassemblies 422, 424 which are interconnected to retain latch 62 in the latched position beneath fuseholder 50. The first subassembly 422 generally comprises end cap 180, squib 410, annular seal member 426, and conducting receptacle 186. As described with reference to FIG. 2, receptacle 186 electrically engages and is physically attached to auxiliary wire 120. The receptacle 186 includes a central bore 187 generally aligned with fuse axis 51 and sized so as to receive a portion of insulating sleeve 419 and a bare segment of lead wire 417 of squib 410. The casing 412 of squib 410 is disposed through a central bore in seal member 426, and the second lead 418 of the squib is retained between lower element termination 86 and lower end cap 180. An o-ring seal 434 is disposed within end cap extension 194 and sized so as to receive second subassembly 424.

The second subassembly 424 comprises a plastic frangible plug 430 and a sleeve member 432. The frangible plug 430 includes a body 431 having a central bore 436 sized so as to slidingly receive the lower portion of squib casing 412. Plug 430 further includes a lower flange 432 having a diameter that is larger than the diameter of body portion 431 and larger than the diameter of aperture 272 of latch 62. Disposed about body 431 of plug 430 is sleeve member 433 which includes two or more outwardly extending tangs 438. Preferably, sleeve 433 is made of brass and is adhesively bonded to plug 430. The outside diameter of sleeve member 433 is smaller than the diameter of aperture 196 in end cap 180 and smaller than the aperture 272 in latch 62.

During manufacture, plug body 431 and attached sleeve 433 are disposed through aperture 272 in latch 62 and through aperture 196 in end cap 180. Tangs 438 are depressed radially inwardly as they are disposed through apertures 272, 196. As plug body 431 is inserted into end cap 180, the squib casing 412 is received within the bore 436 of plug body 431. Once the tangs 438 clear the aperture 196 in end cap 180, they will spring radially outward and prevent plug 430 from being withdrawn. Flange 432 is larger than aperture 272 and thus secures latch 62 in a latched and supporting position beneath fuseholder 50.

When an overcurrent of a predetermined magnitude and duration is conducted through fuseholder 50, the high or low current fusible element 78, 80 will actuate, causing the fault current to be diverted to the current path including auxiliary wire 120. When this occurs, the current is conducted via receptacle 186 and lead wire 417 through the heater element 416 of the squib 410, thereby igniting the primer 415 which in turn ignites powder charge 414. The resulting explosion will sever the retaining plug 430 and release latch 62 allowing it to rotate away from fuseholder 50 in a clockwise direction as viewed from FIG. 19. When this occurs, the fuseholder 50 will drop out of engagement with the cutout mounting 10.

While the preferred embodiments of the invention have been shown and described, modifications thereof can be made by one skilled in the art without departing from the spirit and teachings of the invention. The embodiments described herein are exemplary only, and are not limiting. Many variations and modifications of the invention and apparatus disclosed herein are possible and are within the scope of the invention. Accordingly, the scope of protection is not limited by the description set out above, but is only limited by the claims which follow, that scope including all equivalents of the subject matter of the claims.

What is claimed is:

1. An electrical component comprising:

a body;

a current path through said body;

a support member disposed adjacent to said body;

a conducting pin member extending from said body and releasably attached to said supporting member, said pin member forming a portion of said current path;

means for causing said pin member to release said support member when a current of a predetermined magnitude is conducted through said body.

2. The electrical component of claim 1 wherein said causing means comprises an actuating member engaging said pin.

3. The electrical component of claim 2 wherein said actuating member changes shape when it is heated to a predetermined temperature.

4. The electrical component of claim 3 wherein said actuating member comprises at least one latching extension, said extension engaging said actuating member pin when said is below said predetermined temperature and releasing said pin when said actuating member reaches said predetermined temperature.

5. The electrical component of claim 4 wherein said actuating member is made of a memory alloy.

6. The electrical component of claim 4 wherein said actuating member is made of a bimetallic material.

7. The electrical component of claim 4 wherein said actuating member comprises a clamping ring having a pair of arms disposed about said pin.

8. The electrical component of claim 4 wherein said pin includes at least one recess for engagement with said latching extensions of said actuating member.

9. The electrical component of claim 3 further comprising a heater element in said current path for causing said actuating member to reach said predetermined temperature when a current of a predetermined magnitude is conducted through said body.

10. The electrical component of claim 3 wherein said actuating member is disposed inside said body.

11. The electrical component of claim 3 wherein said actuating member is disposed outside said body.

12. A dropout fuseholder comprising:

an insulative body;

first and second terminal assemblies on said body;

first and second current paths between said terminals, said paths electrically and parallel;

wherein said first current path includes a fusible element; and wherein said second current path comprises:

a conducting pin having a portion extending out of said insulative body; and a heat-responsive latching member releasably engaging said pin member.

13. The fuseholder of claim 12 wherein said second current path further comprises a resistive element for heating said latching member when current is conducted through said second current path.

14. The dropout fuseholder of claim 13 wherein said resistive element is formed of silicon carbide.

15. The dropout fuseholder of claim 13 wherein said latching member in said resistive element are disposed within said insulative body.

16. The dropout fuseholder of claim 13 wherein said latching member and said resistive element are disposed outside said insulative body.

17. The dropout fuseholder of claim 16 wherein said pin includes a retaining head attached to said portion of said pin that extends outside said insulative body, such free end of said latch member disposed between said conductive cap assembly and said retaining head of said pin.

18. The dropout fuseholder of claim 12 wherein said latching member is formed from a memory alloy and wherein said latching member releases said pin when said latching member is heated to a predetermined temperature.

19. The dropout fuseholder of claim 12 wherein said latching member is formed from a bimetallic material and wherein said latching member releases said pin when said latching member is heated to a predetermined temperature.

20. The dropout fuseholder of claim 12 wherein said latching member comprises a clamping ring having a first retaining and a second retaining arm disposed about said pin, said retaining arms releasing said pin when said clamping ring is heated to a predetermined temperature.

21. The dropout fuseholder of claim 12 wherein said second terminal assembly comprises a conductive end cap and a hinge assembly attached to said end cap; and wherein said hinge includes a latch member having a free end rotatable between a nonsupporting and a supporting position beneath said end cap, said free end of said latch member having an aperture therethrough; and wherein said pin is disposed through said aperture of said latch member.

\* \* \* \* \*